United States Patent [19]

Watanabe et al.

[11] Patent Number: 5,055,286

[45] Date of Patent: Oct. 8, 1991

[54] PROCESS FOR PREPARING HIGH PURITY HYDROGEN PEROXIDE

[75] Inventors: Satoru Watanabe; Osami Ohura, both of Fuji, Japan

[73] Assignee: Tokai Denka Kogyo Kabushiki Kaisha, Tokyo, Japan

[21] Appl. No.: 207,176

[22] Filed: Jun. 15, 1988

[30] Foreign Application Priority Data

Dec. 11, 1987 [JP] Japan ............... 62-311838

[51] Int. Cl.$^5$ ............................................. C01B 15/01
[52] U.S. Cl. ................................................. 423/584
[58] Field of Search .................... 423/584; 210/688

[56] References Cited

U.S. PATENT DOCUMENTS

| | | | |
|---|---|---|---|
| 2,676,923 | 4/1954 | Young | 210/688 |
| 3,012,860 | 12/1961 | Meeker et al. | 423/584 |
| 3,074,782 | 1/1963 | Meeker et al. | 423/584 |
| 3,156,531 | 11/1964 | Luten et al. | 423/584 |
| 3,294,488 | 12/1966 | Dunlop et al. | 423/584 |
| 3,297,404 | 1/1967 | Elliott et al. | 423/584 |
| 3,387,938 | 6/1968 | Leaver | 423/584 |
| 4,007,256 | 2/1977 | Kim et al. | 423/584 |

FOREIGN PATENT DOCUMENTS

| | | | |
|---|---|---|---|
| 518748 | 11/1955 | Canada | 423/584 |
| 819434 | 9/1959 | United Kingdom | 423/584 |

*Primary Examiner*—Wayne A. Langel
*Attorney, Agent, or Firm*—Scully, Scott, Murphy & Presser

[57] ABSTRACT

Metal ions contained in hydrogen peroxide can be removed efficiently, safely and inexpensively by contacting hydrogen peroxide to be purified with an anion exchange resin with a chelating agent adsorbed therein.

4 Claims, No Drawings

PROCESS FOR PREPARING HIGH PURITY HYDROGEN PEROXIDE

BACKGROUND OF THE INVENTION

The present invention relates to a process for preparing high purity hydrogen peroxide and more particularly to a process for safe and inexpensive preparation of hydrogen peroxide having purity higher than that of hydrogen peroxide obtained according to the prior art.

Recently, hydrogen peroxide has been used as a detergent for silicon wafer, etc. in the field of electronic industry, and with higher integration of IC there is an increasing demand for higher purity of hydrogen peroxide Generally, in the case of hydrogen peroxide, the material of its manufacturing plant and storage equipment is corroded and dissolved out, resulting in that hydrogen peroxide is contaminated by metal ions. In this case, the kind of metal ions is different depending on the material of the equipment used. Hydrogen peroxide is contaminated by aluminum ion in the case where the material is aluminum, or it is contaminated by such metal ions as iron, chromium and nickel in the case where the material is stainless steel.

Since those impurities exert various bad influences on IC products, various purifying methods for removing them are under study.

Polish Patent Nos. 50,982 and 55,378, Spanish Patent No. 382, 719 and East German Patent No. 51,027 propose methods of removing metal ions contained in hydrogen peroxide by using a sulfonic acid type cation exchange resin in which a styrene-divinylbenzene copolymer is a matrix. However, even according to those proposed methods, there remain 10 ppb or so of metal ions in the hydrogen peroxide after treatment, thus not satisfying the users' demand in the field of electronic industry.

In the article "Chemical Marketing Reporter", Apr. 28, 1986, page 4, there is described a method of removing emulsions from hydrogen peroxide in which hydrogen peroxide after distillation is re-distilled in a distillation equipment comprising a distillation tower made of borosilicate glass and a piping made of polyvinylidene fluoride. Even if hydrogen peroxide is purified by such method, the metal ion content is 0.1 ppm or less. Such a degree of purification for hydrogen-peroxide is insufficient.

As another method of removing metal ions contained in hydrogen peroxide, the present inventions have studied a treating method using metal chelate resins each having amidoxime, amino phosphoric acid or polyamine group in a resin matrix. However, none of such metal chelate resins afforded a satisfactory effect; besides, there is the disadvantage that the organic acid content of hydrogen peroxide increases. Thus, the said method proved to be inappropriate as a metal ion removing method.

SUMMARY OF THE INVENTION

It is the object of the present invention to provide a process capable of removing metal ions contained in hydrogen peroxide efficiently, safely and inexpensively.

The process of the present invention consists in contacting hydrogen peroxide to be purified with an anion exchange resin with a chelating agent absorbed therein.

DETAILED DESCRIPTION OF THE INVENTION

As anion exchange resins there are known those each comprising, as a resin matrix, a styrenedivinyl benzene copolymer, an acrylic polymer or an epoxyamine polymer, and a quaternary ammonium base or a primary, secondary or tertiary amine group incorporated in the resin matrix. The present invention exhibits a particularly outstanding effect when there is used any of Cl type strongly basic anion exchange resins each comprising, as a matrix, a styrene-divinylbenzene copolymer, an acrylic polymer or an epoxyamine polymer, and a quaternary ammonium base incorporated in the matrix. OH type anion exchange resins are dangerous because their alkalinity causes vigorous decomposition of hydrogen peroxide, so the use thereof should be avoided.

The chelating agent used has at least three acid groups selected from carboxyl groups and phosphonic acid groups in the molecule thereof. Particularly, chelating agents having acid groups at least one of which is not less than eight in terms of pH value at an inflection point thereof on a neutralization titration curve and the rest of which are less than eight in terms of pH value at their inflection points on the same curve, exhibit a particularly outstanding effect. Preferred examples of such chelating agents are alkali metal salts of hydroxyethylethylenediaminetriacetic acid, nitrilotriacetic acid, ethylenediaminetetraacetic acid, diethylenetriaminepentaacetic acid, triethylenetetraminehexaacetic acid, nitrilotri(methylenephosphonic acid), 1-hydroxyethylidene-1,1-diphosphonic acid, ethylenediaminetetra(methylenephosphonic acid), and diethylenetriaminepenta(methylenephosphonic acid). Other preferred examples of chelating agents are alkali metal salts of dihydroxyethylglycine and hydroxyethyliminodiacetic acid.

The adsorption is performed by pouring an aqueous solution of one or more of the above-exemplified chelating agents into a column charged with, for example a Cl type anion exchange resin. Preferably, the amount of the chelating agent used is not smaller than one third of the total ion exchange capacity of the anion exchange resin and not larger than twice such total ion exchange capacity. The chelating agent may be used in an amount more than twice the said total ion exchange capacity, but this is disadvantageous from the economic point of view and an amount thereof smaller than one third of such total ion exchange capacity would result in deteriorated treating capacity for hydrogen peroxide, thus requiring frequent repetition of a regeneration step and so making the operation more complicated.

After the chelating agent adsorbing treatment, the resin in the column should be washed thoroughly with pure water until there is no leak of chloride ion to prevent the treated hydrogen peroxide from being contaminated by chloride ion. As to others operations for the chelating agent adsorption treatment, it is sufficient to perform them in accordance with a known resin column regenerating method for ion exchange resins.

The hydrogen peroxide purifying process of the present invention can be carried out in accordance with a conventional resin column purifying process which is known as a hydrogen peroxide purifying process except that such a specific chelating agent-adsorbed resin as defined herein is used as the material to be charged into the resin column. The purification temperature may usually be room temperature or thereabouts. It is not necessary to specially cool the column to prevent the decomposition of hydrogen peroxide because there is recognized no rise of temperature caused by the decomposition of hydrogen peroxide during the purification treatment.

The hydrogen peroxide purifying ability of the chelating agent-adsorbed anion exchange resin differs depending on the kind and amount of the chelating agent used and the degree of contamination of hydrogen peroxide by metal ions, but in the case of purifying ordinary hydrogen peroxide for industrial use, it is possible at a single regeneration to treat hydrogen peroxide in a volume 300 to 1,000 times the volume of the anion exchange resin used.

The regeneration of the anion exchange resin may be performed in accordance with the foregoing method for the chelating agent adsorption treatment. The regeneration never deteriorates the hydrogen peroxide purifying ability of the anion exchange resin. When 35% hydrogen peroxide of a volume about 10,000 times the volume of the resin was treated under repetition of the regenerating operation, there was recognized no deterioration of the hydrogen peroxide purifying ability.

The hydrogen peroxide thus purified according to the process of the present invention is characteristic in that the metal ion content decreases to several ppb or lower without increase in the content of chloride ion, phosphate ion and free acid and that the total organic matter carbon content as an index of the organic matter content also decreases. Its quality can fully satisfy the users' demand in the field of electronic industry.

At present, autoxidation is predominant as the hydrogen peroxide manufacturing process. Incorporation of an organic compound in the hydrogen peroxide prepared according to the process of the present invention is unavoidable, and as the method for removing such organic matter there is proposed a treating method using an organic matter adsorbing resin in Japanese Patent Publication No. 26095/1971. However, such treatment using an organic matter adsorbing resin is not needed if hydrogen peroxide is purified according to the present invention. Besides, unlike a known hydrogen peroxide purifying method using a resin column, it is not necessary in the present invention to use two kinds of ion exchange resins which are a cation exchange resin and an anion exchange resin. Consequently, the purification process is greatly simplified in the present invention.

The following working examples are given to illustrate the present invention in more detail, but it is to be understood that the invention is not limited thereto at all.

EXAMPLE 1

50 ml of a Cl type Amberlite IRA-900 (tradename, a product of Japan Organo Co., Ltd.) which is a styrene-divinylbenzene copolymer-based anion exchange resin having a quaternary ammonium base as an ion exchange group was charged into a column and 250 ml of a 0.3N aqueous chelating agent solution was poured into the column over a period of one hour to effect a chelating agent adsorbing treatment.

Thereafter, 500 ml of pure water was passed through the column over a 2 hour period to effect washing.

Then, 35% hydrogen peroxide was passed through the column for 10 hours at a rate of 1,000 ml/hr and thereby purified. The feed hydrogen peroxide and the treated hydrogen peroxide were analyzed for components. The results of the analysis are as shown in Table 1. The chelating agents used are all sodium salts.

As shown in the results of Table 1, the purifying effect is outstanding and the superiority of the purifying process of the present invention using the chelating agent-adsorbed anion exchange resin is apparent.

TABLE 1

| Chelating Agent for Treating Hydrogen peroxide | $H_2O_2$ content (%) | Al (ppb) | Fe (ppb) | Ni (ppb) | Cr (ppb) | Total chlorine (ppm) | Total $PO_4$ (ppm) | Total organic carbon (ppm) |
| --- | --- | --- | --- | --- | --- | --- | --- | --- |
| Hydroxyethyliminodiacetic acid | 35.2 | 5> | 1> | 1> | 1> | 0.05> | 0.5 | 5.6 |
| Hydroxyethylethylenediamine-triacetic acid | 35.2 | 3> | 1> | 1> | 1> | 0.05> | 0.3 | 6.0 |
| Nitrilotriacetic acid | 35.1 | 2> | 1> | 1> | 1> | 0.05> | 0.2 | 5.2 |
| Ethylenediaminetetraacetic acid | 35.2 | 1> | 1> | 1> | 1> | 0.05> | 0.1 | 6.5 |
| Diethylenetriaminepentaacetic acid | 35.1 | 3> | 1> | 1> | 1> | 0.05> | 0.3 | 6.5 |
| Triethylenetetraminehexaacetic acid | 35.3 | 3> | 1> | 1> | 1> | 0.05> | 0.4 | 5.8 |
| Nitrilotri(methylenephosphonic acid) | 35.2 | 3> | 1> | 1> | 1> | 0.05> | 0.4 | 5.6 |
| 1-Hydroxyethylidene-1,1-diphosphonic acid | 35.1 | 3> | 1> | 1> | 1> | 0.05> | 0.3 | 6.1 |
| Ethylenediaminetetra(methylenephosphonic acid) | 35.2 | 2> | 1> | 1> | 1> | 0.05> | 0.2 | 5.9 |
| Diethylenetriaminepenta(methylenephosphonic acid) | 5.2 | 5> | 1> | 1> | 1> | 0.05> | 0.3 | 5.7 |
| Feed 35% hydrogen peroxide | 35.3 | 151 | 6 | 3 | 5 | 0.05 | 0.5 | 17.2 |

EXAMPLE 2

Resin regenerating and hydrogen peroxide purifying steps were repeated 39 times using tetrasodium salt of ehtylenediaminetetraacetic acid as a regenerate in the method of Example 1 and 35% hydrogen peroxide was purified using the resin after the 40th regeneration. The results are as set forth in Table 2. As shown therein, there was recognized no deterioration int eh hydrogen peroxide purifying performance of the anion exchange resin even after repetition of the resin regenerating operation 40 times.

TABLE 2

| | Feed Hydrogen peroxide | Treated Hydrogen peroxide |
| --- | --- | --- |
| Content (%) | 35.3 | 35.1 |
| Al (ppb) | 159 | 1 |

TABLE 2-continued

|  | Feed Hydrogen peroxide | Treated Hydrogen peroxide |
| --- | --- | --- |
| Fe (ppb) | 6 | 1 |
| Ni (ppb) | 4 | 1 |
| Cr (ppb) | 5 | 1 |
| Chloride (ppm) | 0.05 | 0.05 |
| Total PO$_4$ (ppm) | 0.5 | 0.3 |
| Total Organic Carbon (ppm) | 16.8 | 5.6 |

What is claimed is:

1. A process for purifying hydrogen peroxide, characterized by contacting hydrogen peroxide with an anion exchange resin; said resin having a chelating agent absorbed therein, wherein said contacting comprises passing said hydrogen peroxide through said resin having said chelating agent adsorbed therein; wherein said chelating agent contains in the molecule thereof at least three acid groups and wherein said acid groups are carboxyl groups or phosphonic acid groups.

2. A process as set forth in claim 1, wherein at least one of the acid groups of the chelating agent is not less than eight in terms of pH value at an inflection point thereof and the remaining acid groups are less than eight in terms of pH value at their inflection points on the same curve.

3. A process as set forth in any one of claims 1 and 2 wherein the chelating agent is a compound selected from the group consisting of alkali metal salts of hydroxyethylethylenediaminetriacetic acid, nitrilotriacetic acid, ethylenediaminetetraacetic acid, diethylenetriaminepentaacetic acid, triethylenetetraminehexaacetic acid, nitrilotri(methylenephosphonic acid), ethylenediaminetetra(methylenephosphonic acid) and diethylenetriaminepenta(methylenephosphonic acid).

4. The process as set forth in any one of claims 1 and 2, wherein the anion exchange resin is a Cl type strongly basic anion exchange resin comprising as a matrix a styrene-divinylbenzene copolymr, an acrylic polymer or an epoxyamine polymer and a quaternary ammonium base.

* * * * *

UNITED STATES PATENT AND TRADEMARK OFFICE
CERTIFICATE OF CORRECTION

PATENT NO. : 5,055,286

DATED : October 8, 1991

INVENTOR(S) : Satoru Watanabe, et al.

It is certified that error appears in the above-identified patent and that said Letters Patent is hereby corrected as shown below:

Column 1, line 31: "51,027" should read as --51,025.--.

Column 1, line 42: "emulations" should read as --metal ions--.

Column 1, line 48: "hydrogen-peroxide" should read as --hydrogen peroxide--

Column 1, line 51: "inventions" should read as --inventors--.

Column 1, line 53: "amino phosphoric" should read as --aminophosphoric--.

Column 4, line 59: "int eh" should read as --in the--.

Column 5, line 16, Claim 1: "absorbed" should read as --adsorbed--.

UNITED STATES PATENT AND TRADEMARK OFFICE
CERTIFICATE OF CORRECTION

PATENT NO. : 5,055,286

DATED : October 8, 1991

INVENTOR(S) : Satoru Watanabe, et al

It is certified that error appears in the above-identified patent and that said Letters Patent is hereby corrected as shown below:

Column 6, line 19, Claim 4: "copolymr" should read as --copolymer--.

Signed and Sealed this

Eighteenth Day of May, 1993

Attest:

MICHAEL K. KIRK

Attesting Officer

Acting Commissioner of Patents and Trademarks